(12) United States Patent
Chen et al.

(10) Patent No.: US 9,876,845 B2
(45) Date of Patent: *Jan. 23, 2018

(54) DATA TRANSMISSION

(71) Applicant: International Business Machines Corporation, Armonk, NY (US)

(72) Inventors: Qi Chen, Shanghai (CN); Chao Zheng, Shanghai (CN); Xiang Zhou, Shanghai (CN); Xiao W. Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 242 days.

This patent is subject to a terminal disclaimer.

(21) Appl. No.: 14/628,738

(22) Filed: Feb. 23, 2015

(65) Prior Publication Data

US 2015/0244827 A1  Aug. 27, 2015

(30) Foreign Application Priority Data

Feb. 24, 2014  (CN) .......................... 2014 1 0061211

(51) Int. Cl.
*G06F 15/167* (2006.01)
*H04L 29/08* (2006.01)

(52) U.S. Cl.
CPC ............. *H04L 67/06* (2013.01); *H04L 67/02* (2013.01); *H04L 67/2852* (2013.01)

(58) Field of Classification Search
CPC ...... H04L 67/02; H04L 67/06; H04L 67/2852

(Continued)

(56) References Cited

U.S. PATENT DOCUMENTS 6,912,591 B2  6/2005  Lash
7,360,025 B1  4/2008  O'Connell et al.
(Continued)

FOREIGN PATENT DOCUMENTS

CN  102420822 A  4/2012
CN  103428188 A  12/2013

OTHER PUBLICATIONS

Anonymous, Effective Use of Caching to Boost VoiceXML Application Performance, Tellme.studio, https://studio.tellme.com/vxml2/ovw/perf/caching.html, Feb. 8, 2002.

*Primary Examiner* — Joseph E Avellino
*Assistant Examiner* — Marshall McLeod
(74) *Attorney, Agent, or Firm* — Francis Lammes; Stephen J. Walder, Jr.; Richard A. Wilhelm

(57) ABSTRACT

Embodiments of this disclosure belong to the data processing field and disclose a method and apparatus for data transmission. The method comprises sending a first request to a server in response to a first file locally cached having expired. The first request is for obtaining a first file in a new version, and the first request containing a first version identifier. The first version identifier being for indicating a version of the first file locally cached. Receiving a first response includes difference information and a second version identifier. The difference information makes it possible to obtain the first file in the new version based on the first file locally cached, and the second version identifier is for indicating the new version. The first file in the new version is obtained based on the difference information and the first file locally cached. Using the technical solution provided by the present embodiment(s), pressures on network transmission are reduced.

9 Claims, 8 Drawing Sheets

(58) Field of Classification Search
USPC .................................. 709/213, 216, 217
See application file for complete search history.

(56) References Cited

U.S. PATENT DOCUMENTS

| | | | |
|---|---|---|---|
| 7,970,816 B2 | 6/2011 | Chess et al. | |
| 8,656,020 B1* | 2/2014 | Rademacher | G06F 17/30902 709/203 |
| 2002/0161860 A1* | 10/2002 | Godlin | G06F 17/30212 709/219 |
| 2002/0188665 A1* | 12/2002 | Lash | G06F 17/30902 709/203 |
| 2004/0128346 A1 | 7/2004 | Melamed et al. | |
| 2006/0064467 A1 | 3/2006 | Libby | |
| 2010/0161717 A1* | 6/2010 | Albrecht | H04L 67/2852 709/203 |
| 2014/0053227 A1* | 2/2014 | Ruppin | G06F 21/10 726/1 |

* cited by examiner

DATA TRANSMISSION

CROSS REFERENCE TO RELATED APPLICATIONS

This application claims priority under 35 U.S.C. §119 from Chinese Patent Application No. 201410061211.6 filed Feb. 24, 2014, the entire contents of which are incorporated herein by reference.

FIELD

The present embodiments relate to information processing, and more specifically, to a method and apparatus for data transmission.

BACKGROUND

Nowadays, people's life increasingly relies on various network applications. In the face of soaring demand for network transmission, how to save network resources and reduce pressures on network transmission becomes a burning issue.

When a user accesses a web page, the browser will send a request to a corresponding server for obtaining the corresponding web page; upon receiving the request, the server will return a response to the user's browser to indicate a file to be loaded by the user's browser and a corresponding address. The browser will cache obtained files locally in order to reduce pressures on network transmission and prevent the user from obtaining corresponding files each time he/she accesses the web page. If the user needs a file once again when accessing the web page, the browser will check whether the file has been cached; if the file has been cached and does not expire, then the browser will directly use the file without obtaining it through the network. If the file expires, then the browser will request a corresponding server for the file. Using this method, pressures on network transmission can be reduced to some extent. However, where cached files expire, there still exists huge file transmission, and therefore the solution needs further optimization.

SUMMARY

In view of the above problems in the prior art, embodiments herein provide an apparatus for data transmission to reduce pressures on network transmission.

According to one aspect, an apparatus for data transmission is provided. The apparatus comprising: a first requesting module configured to send a first request to a server in response to a first file locally cached having expired, the first request being for obtaining a first file in a new version, and the first request containing a first version identifier, the first version identifier being for indicating a version of the first file locally cached; a first receiving module configured to receive a first response sent by the server, the first response including difference information and a second version identifier, wherein the difference information makes it possible to obtain the first file in the new version based on the first file locally cached, and the second version identifier is for indicating the new version; a difference processing module configured to obtain the first file in the new version based on the difference information and the first file locally cached.

According to another aspect, an apparatus for data transmission is provided. The apparatus comprising: a second receiving module configured to receive a first request, the first request being for obtaining a first file; a second sending module configured to, in response to the first request comprising a first version identifier, send a first response to a sender of the first request, wherein the first version identifier is for indicating a version of the first file locally cached at the sender, the first response comprising difference information and a second version identifier, the difference information being for making it possible to obtain a first file in a new version based on the first file locally cached, the second version identifier being for indicating the new version.

The technical solution provided by the present embodiments can reduce pressures on network transmission.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
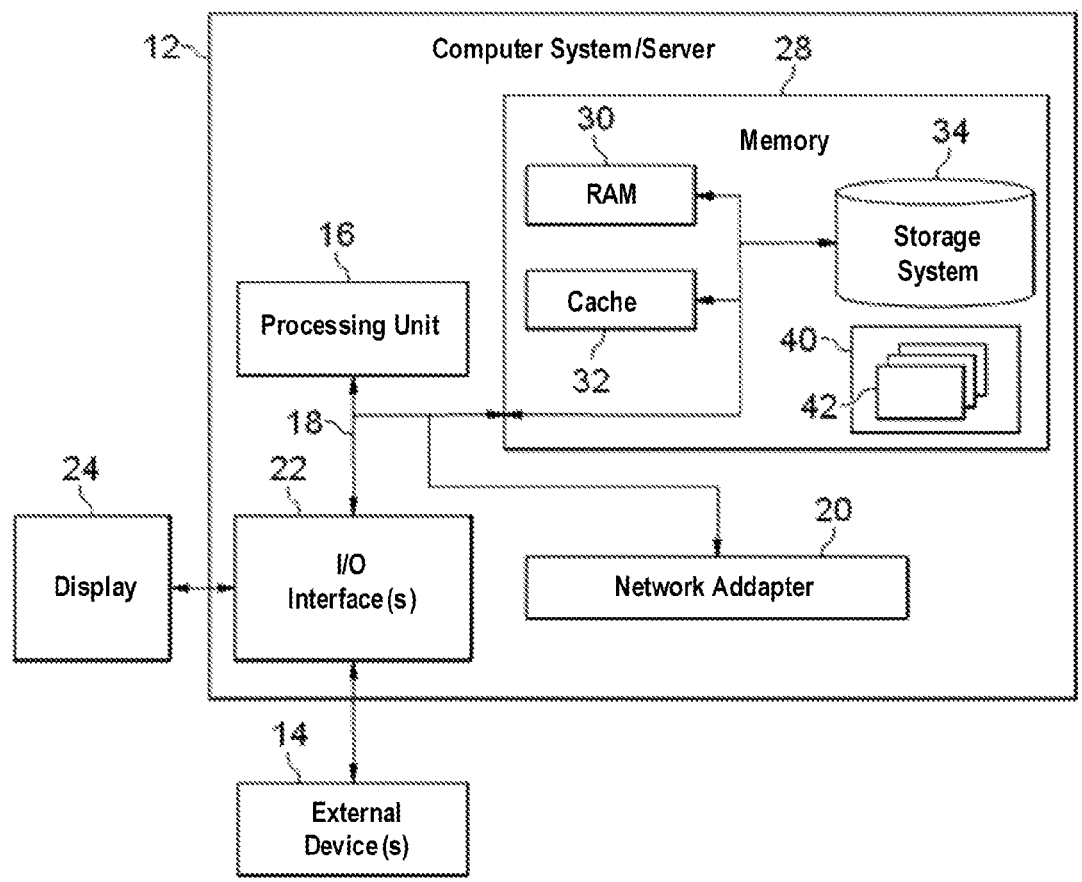
FIG. 1 shows an exemplary computer system/server which is applicable to implement the embodiments.

Referring now to FIG. 1, in which an exemplary mobile device (12) which is applicable to implement the embodiments is shown. Mobile device (12) is only illustrative and is not intended to suggest any limitation as to the scope of use or functionality of embodiments described herein.

As shown in FIG. 1, mobile device (12) is shown in the form of a general-purpose computing device. The components of mobile device (12) may include, but are not limited to, one or more processors or processing units (16), a system memory (28), and a bus (18) that couples various system components including system memory (28) to processor (16).

Bus (18) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Mobile device (12) typically includes a variety of computer system readable media. Such media may be any available media that is accessible by mobile device (12), and it includes both volatile and non-volatile media, removable and non-removable media.

System memory (28) can include computer system readable media in the form of volatile memory, such as random access memory (RAM) (30) and/or cache memory (32). Mobile device (12) may further include other removable/non-removable, volatile/non-volatile computer system storage media. By way of example only, storage system (34) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (18) by one or more data media interfaces. As will be further depicted and described below, memory (28) may include at least one program product having a set (e.g., at least one) of program modules that are configured to carry out the functions of the embodiments.

Program/utility (40), having a set (at least one) of program modules (42), may be stored in memory (28) by way of example, and not limitation, as well as an operating system, one or more application programs, other program modules, and program data. Each of the operating system, one or more application programs, other program modules, and program data or some combination thereof, may include an implementation of a networking environment. Program modules (42) generally carry out the functions and/or methodologies of the embodiments as described herein.

Mobile device (12) may also communicate with one or more external devices (14) such as a keyboard, a pointing device, a display (24), etc.; one or more devices that enable a user to interact with mobile device (12); and/or any devices (e.g., network card, modem, etc.) that enable mobile device (12) to communicate with one or more other computing devices. Such communication can occur via Input/Output (I/O) interfaces (22). Still yet, mobile device (12) can communicate with one or more networks such as a local area network (LAN), a general wide area network (WAN), and/or a public network (e.g., the Internet) via network adapter (20). As depicted, network adapter (20) communicates with the other components of mobile device (12) via bus (18). It should be understood that although not shown, other hardware and/or software components could be used in conjunction with mobile device (12). Examples, include, but are not limited to: microcode, device drivers, redundant processing units, external disk drive arrays, RAID systems, tape drives, and data archival storage systems, etc.

Figure 2:
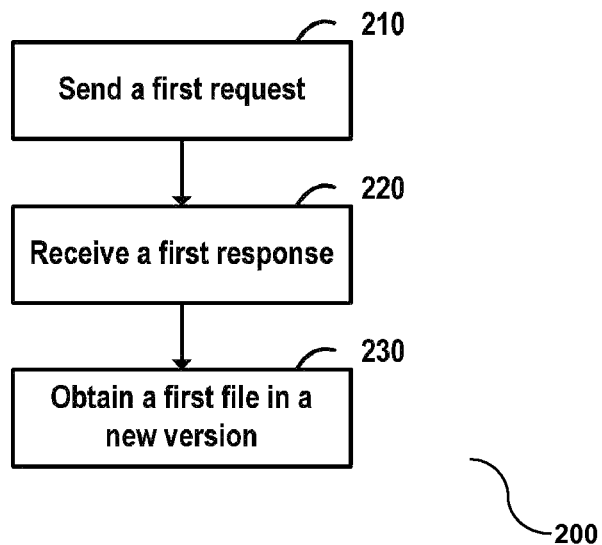
FIG. 2 shows a schematic flowchart of one data transmission method according to one embodiment.

With reference now to FIG. 2, a flow chart (200) is provided illustrating a data transmission method. The method comprises: in step (210), sending a first request to a server in response to a locally cached first file having expired, the first request being for obtaining the first file in a new version, and the first request containing a first version identifier, the first version identifier being for indicating a version of the locally cached first file; in step (220), receiving a first response sent by the server, the first response including difference information and a second version identifier, wherein the difference information makes it possible to obtain the first file in the new version based on the locally cached first file, and the second version identifier is for indicating the new version; in step (230), obtaining the first file in the new version based on the difference information and the locally cached first file. Using the data transmission method provided by this embodiment, when a locally cached file expires, difference information can be obtained from a server only, and the file in a new version can be obtained based on the difference information and the locally cached file. In this manner, data transmitted through the network is not all contents of the file in the new version but only the difference information. Therefore, contents transmitted through the network are reduced significantly and pressures on network transmission are alleviated. In particular, when a couple of users request the same difference information, the impact of overheads for generating difference information is decreased, while the effect of reduced network traffic becomes more prominent. The server referred to in the embodiments may be, for example, a real server device, software on a server, other personal computer or a device in a distributed computing environment. The present disclosure is not intended to limit the server to a concrete form of the server, provided that the server can receive the first request and has the capability of above processing.

In one embodiment, step (230) may be, for example, implemented in the form of patching or implemented by other prior art.

In one embodiment, the method as shown in FIG. 2 is usually implemented at the user end, for example, may be implemented as new browser or a browser plug-in.

In one embodiment, the difference information may be generated by an existing version control system. For example, the difference information may comprise instructions on a series of operations as to how to obtain the second version based on the first version.

In one embodiment, the method as shown in FIG. 2 may further comprise a step of: storing the second version identifier in association with the obtained new version of the first file. Thus, a certain file in a version can be learned directly without a need to extract the file's version from the file.

In one embodiment, it may be judged, when the user intends to access a certain web page, whether a needed file has been cached or whether the cached needed file expires.

In one embodiment, the first file may be a static file in a web page, a web page or a part of a web page.

In one embodiment, in the method as shown in FIG. 2, the first request further comprises an Allow identifier, the Allow identifier indicating it is locally capable of processing difference information; and in response to the first request comprising the Allow identifier, the first response comprises the difference information and the second version identifier. In another embodiment, if the first request does not comprise an Allow identifier, then the first response only comprises the first file in the new version but does not comprise the difference information or the second version identifier. By adding the Allow identifier, the whole solution is made more flexible, and it is possible to conveniently differentiate clients that support from those that do not support obtaining of the first file in the new version from the difference information.

In one embodiment, the method as shown in FIG. 2 may further comprise: checking whether there is locally cached a first file or not; sending a second request in response to no first file being locally cached, the second request being for obtaining the first file; receiving a second response sent by the server, the second response comprising the first file and a third version identifier, the third version identifier being for indicating a version of the first file as included in the second response. By receipt of the third version identifier, when the first file expires in future, only the difference information instead of a complete first file in the new version may be obtained, thereby reducing pressures on network transmission.

In one embodiment, the method as shown in FIG. 2 further comprises: judging whether a received response comprises difference information; in response to the received response comprising the difference information, executing the step of obtaining the first file in the new version according to the difference information and the locally cached first file; in response to the received response not comprising the difference information, caching a first file in the response.

Figure 3:
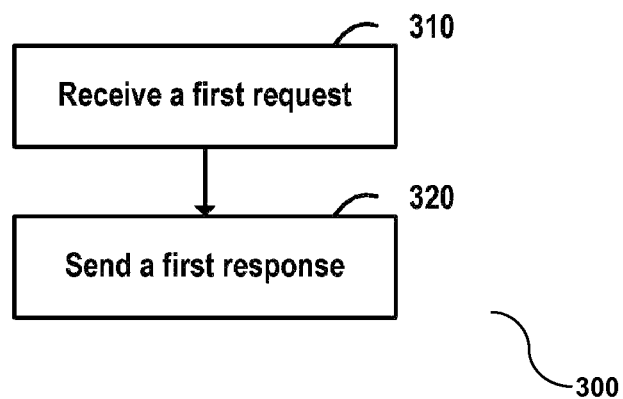
FIG. 3 shows a schematic flowchart of another data transmission method according to one embodiment.

With reference to FIG. 3, a flow chart (300) is provided illustrating a data transmission method. The method comprising: in step (310), receiving a first request, the first request being for obtaining a first file; in step (320), in response to the first request comprising a first version identifier, sending a first response to a sender of the first request, wherein the first version identifier is for indicating a version of the locally cached first file at the sender, the first response comprising difference information and a second version identifier, the difference information being for making it possible to obtain the first file in a new version based on the locally cached first file, the second version identifier being for indicating the new version. Using the method provided by this embodiment, difference information may be provided to reduce contents for network transmission, thereby alleviating pressures on network transmission.

In one embodiment, the method as shown in FIG. 3 may be, for example, implemented on a server, which server may comprise a version control system, or may not comprise a version control system but is connected with a device having a version control system.

In one embodiment, the method as shown in FIG. 3 further comprises the step of: generating the difference information according to the first version identifier. Specifically, version control techniques in the prior art may be used to generate the difference information with respect to the first file in the new version and a first file in a version indicated by the first version identifier.

In one embodiment, the method as shown in FIG. 3 further comprises: sending the first version identifier to a version control system and receiving the difference information and the second version identifier from the version control system.

In one embodiment, the method as shown in FIG. 3 further comprises: sending a second response to the sender in response to the first request comprising an Allow identifier but not comprising the first version identifier, the second response comprising the first file and a third version identifier, the third version identifier being for indicating a version of the first file comprised in the second response. In this embodiment, since the first request contains an Allow identifier, it indicates the client has a capability of obtaining the new version file according to the difference information; however, since the first request does not contain the first version identifier, it indicates the client has not cached the first file, so the server end needs to send the first file in a latest version to the client. Additionally, by indicating a version of the first file, it is made convenient for the client to record a version of the first file, and when the file expires later, only the difference information is obtained according to the version directly, but it is no longer necessary to obtain a complete first file in the new version.

In one embodiment, the method as shown in FIG. 3 further comprises: sending a second response to the sender in response to the first request not comprising an Allow identifier or the first version identifier, the second response comprising the first file and a third version identifier, the third version identifier being for indicating a version of the first file comprised in the second response. With reference to the above embodiment, more implementations can be obtained. For example, the embodiment as shown in FIG. 3 further comprises: sending a second response to the sender in response to the first request not comprising the first version identifier, the second response comprising the first file and a third version identifier, the third version identifier being for indicating a version of the first file comprised in the second response. Other examples that can be obtained by reference or in combination are not detailed here.

In one embodiment, step (320) for example comprises: in response to the first request comprising a first version identifier, sending a first response to a sender of the first request according to a defined rule, wherein the defined rule is for striking a balance between overheads for generating the difference information and traffic saved by transferring the difference information. By taking into account overheads for generating the difference information and traffic saved by transferring the difference information, other data transmission solution may be selected when overheads for generating the difference information are obviously greater than traffic saved by transferring the difference information. For example, in response to the first request comprising a first version identifier, it is determined to send a second response to a sender of the first request according to a defined rule. That is, when overheads for generating the difference information are obviously greater than traffic saved by transferring the difference information, a complete first file in the new version in place of the difference information is directly sent to the client.

In one embodiment, the defined rule may for example comprise at least one of: if a version indicated by the first version identifier is later than a defined version, sending a first response to the sender; if overheads for generating the difference information are less than a defined value, sending a first response to the sender; if the generated difference information is smaller than the first file in the new version, sending a first response to the sender; if overheads for generating the difference information are less than traffic saved by transferring the difference information, sending a first response to the sender; if a network environment is better than a defined value, sending a first response to the sender; if a version indicated by the first version identifier belongs to defined versions, sending a first response to the sender; if a version indicated by the first version identifier belongs to first scope, sending a first response to the sender, wherein the first scope is obtained through learning process. Those skilled in the art can obtain more defined rules according to these examples of the defined rule. In this embodiment, during implementation that a version indicated by the first version identifier belongs to defined versions, some versions may be specified; the version indicated by the first version identifier belongs to defined versions if being consistent with or different than a specified version. Similarly, during implementation that a version indicated by the first version identifier belongs to first scope, the version indicated by the first version identifier belongs to the first scope if being within or beyond scope determined through learning process. The learning process may be, for example, learning through the same user making a request, and further may be learning through multiple users making a request. While striking a balance between overheads for generating the difference information and traffic saved by transmitting the difference information, cumulative effects of multiple users may be considered. For example, if difference information is generated and delivered for only one user, then overheads for generating the difference information might exert some impact; if difference information is delivered for multiple users, since the difference information needs to be generated only once, the impact exerted by overheads for generating the difference information is decreased significantly, while advantages from traffic saved by delivering the difference information will increase markedly.

The above embodiments may be combined and refer to each other for obtaining more embodiments. With references to FIGS. 4 to 8, examples of combining these embodiments are presented below, and those skilled in the art may obtain more with reference to these examples.

Figure 4:
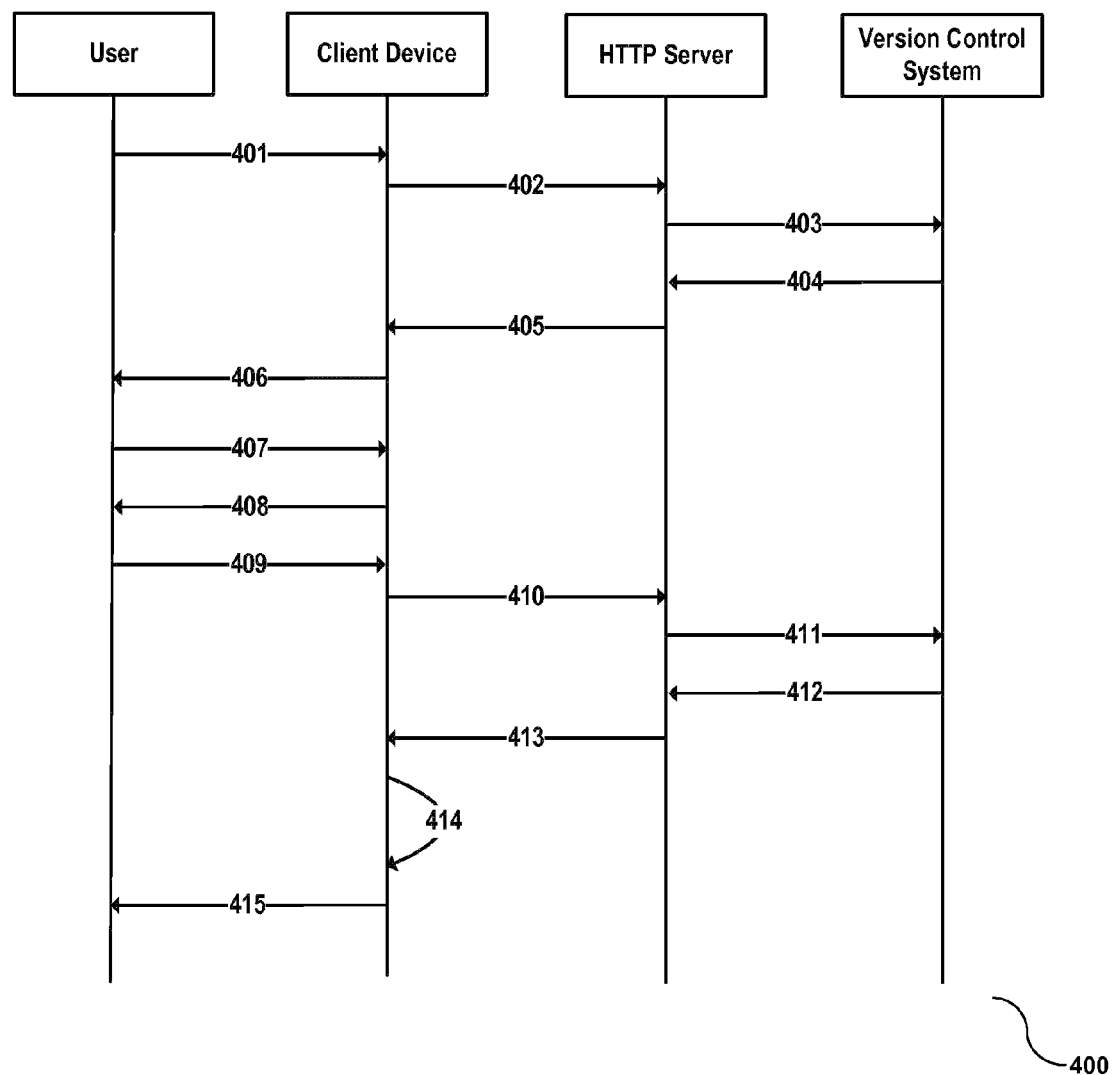
FIG. 4 shows a schematic flowchart of one example of combining multiple embodiments.

Referring to FIG. 4, an information stream relationship (400) among a user, a client device, an HTTP server and version control information is provided. In step (401), the user requests to browse a web page A. In step (402), the client device requests the HTTP server to obtain a file 1 needed for browsing web page A, and the Allow flag is Allow, which is indicated by setting header: Allow-Diff to true. In step (403), the HTTP server requests the file 1 in a latest version to the version control system. In step (404), the version control system provides the file 1 in the latest version and a version identifier of the latest version. In step (405), the HTTP server sends to the client device an HTTP Response containing the file 1 in the latest version and the version identifier of the latest version, wherein the version identifier is transferred by the header: Diff-Version. Since the HTTP Response includes no difference information, the header: setting is false. In step (406), the client device, after receiving the HTTP Response, uses the file 1 in the latest version to execute or display web page A. In step (407), the user requests to browse web page A once again. In step (408), the client device checks the catch and determines file 1 is cached and has not expired, then file 1 is directly used to execute or display web page A. In step (409), the user requests to browse web page A again. In step (410), the client device discovers cached file 1 has expired, and then sends to the HTTP server an HTTP Request containing an Allow flag and a version of cached file 1, wherein Allow is represented by the header setting true, and the version of cached file 1 is represented by the header setting false. In step (411), the HTTP server provides the version of file 1 cached at the client to the version control system and requests difference information of file 1. In step (412), the version control system sends to the HTTP server difference information and a version identifier of the current latest version of file 1. In step (413), the HTTP server sends an HTTP response to the client device, wherein that header setting is true represents difference information is being sent, and the version identifier of the file 1 in the current latest version is represented by header Diff-Version:3gf9jk. In step (414), the client device obtains the file 1 in the current latest version according to the difference information and cached file 1. In step (415), the client device uses the file 1 in the current latest version to execute or display web page A.

Figure 5:
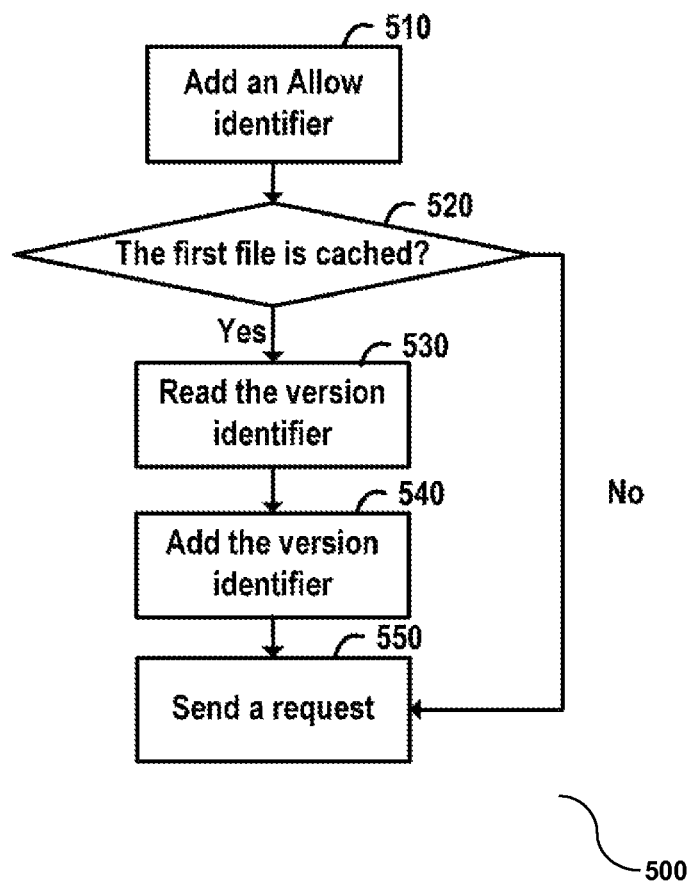
FIG. 5 shows a schematic flowchart of another example of combining multiple embodiments.

Referring to FIG. 5, a flow chart (500) is provided showing a method executed by the client device. The method comprises: in step (510), adding to HTTP Request 1 an Allow flag, e.g., header Allow-Diff:true; in step (520), judging whether or not there exists a first file in the cache, if yes executing step (530), if not executing step (550); in step (530), reading a version flag of the cached first file, e.g., a version number; in step (540), adding to HTTP Request 1 the read version identifier, for example, adding header Diff-Version:{XXXX}, wherein XXXX is the version number being read; in step (550), sending HTTP Request1 to the server. Those skilled in the art may understand the order between these steps may be adjusted, for example, as long as step (510) is executed before step (550).

Figure 6:
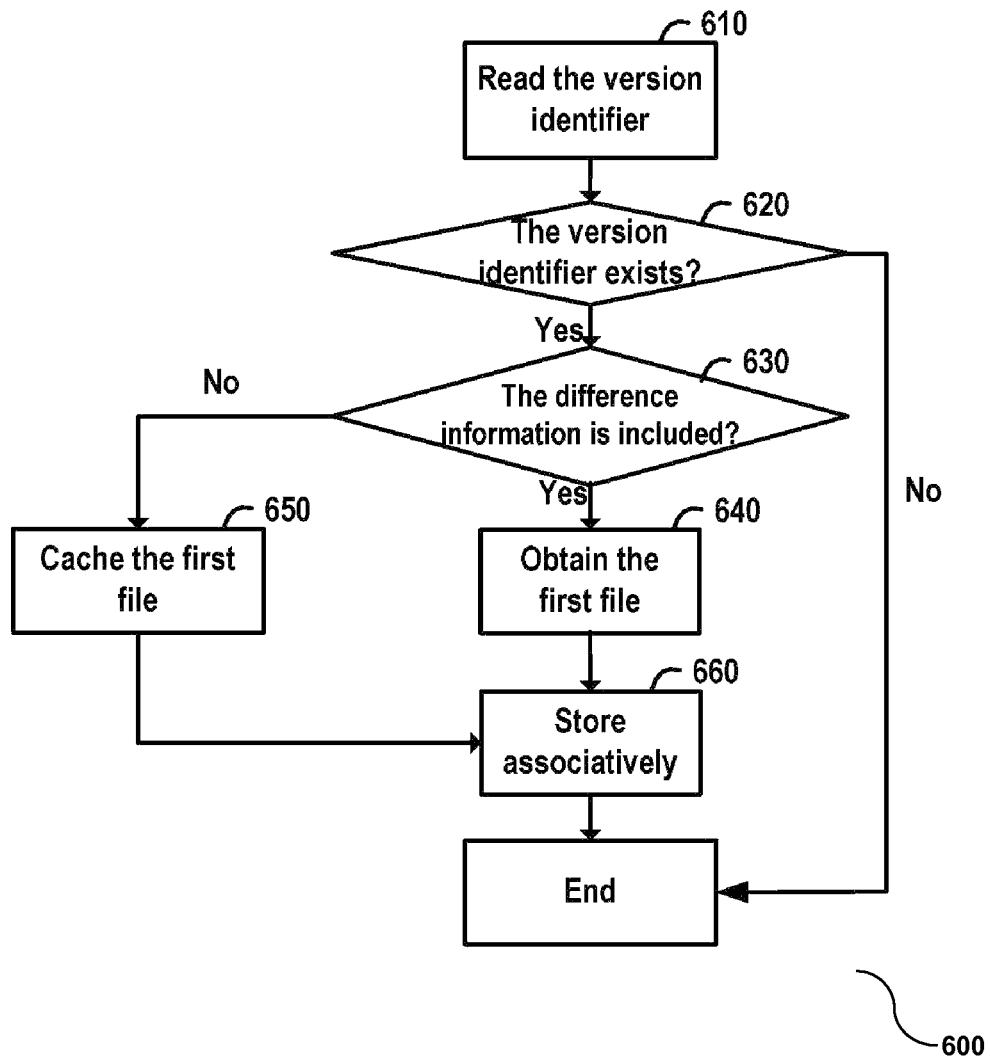
FIG. 6 shows a schematic flowchart of a further example of combining multiple embodiments.

Referring to FIG. 6, a flow chart (600) is provided showing a method executed by the client device. The method comprises: in step (610), reading a version identifier in an HTTP Response, e.g., header Diff-Version contained in the HTTP Response; in step (620), judging whether there exists the version identifier or not, if yes proceeding to step (630), if not ending; in step (630), judging whether the HTTP Response includes difference information or not, if yes executing step (640), if not executing step (650), for example, the judgment is made by header Is-Diff in the HTTP Response, if Is-Diff is true, then there is included difference information, if Is-Diff is false, then there is included no difference information; in step (640), obtaining the first file in a new version according to the difference information and the cached first file, for example, obtaining the first file in a new version according by patching the cached first file according to the difference information; in step (650), caching the first file contained in the HTTP Response; in step (660), storing the version identifier in the HTTP Response in association with the first file. Wherein associative storage may be managed by a table for example or implemented by other means. In this embodiment, further, step (650) may comprise deleting an original first file in cache. Those skilled in the art may understand part of the steps in the example shown in FIG. 6 may be removed, e.g., step (610) may be removed; the order between part of the steps may be adjusted, e.g., so long as step (660) is executed after step (610).

Figure 7:
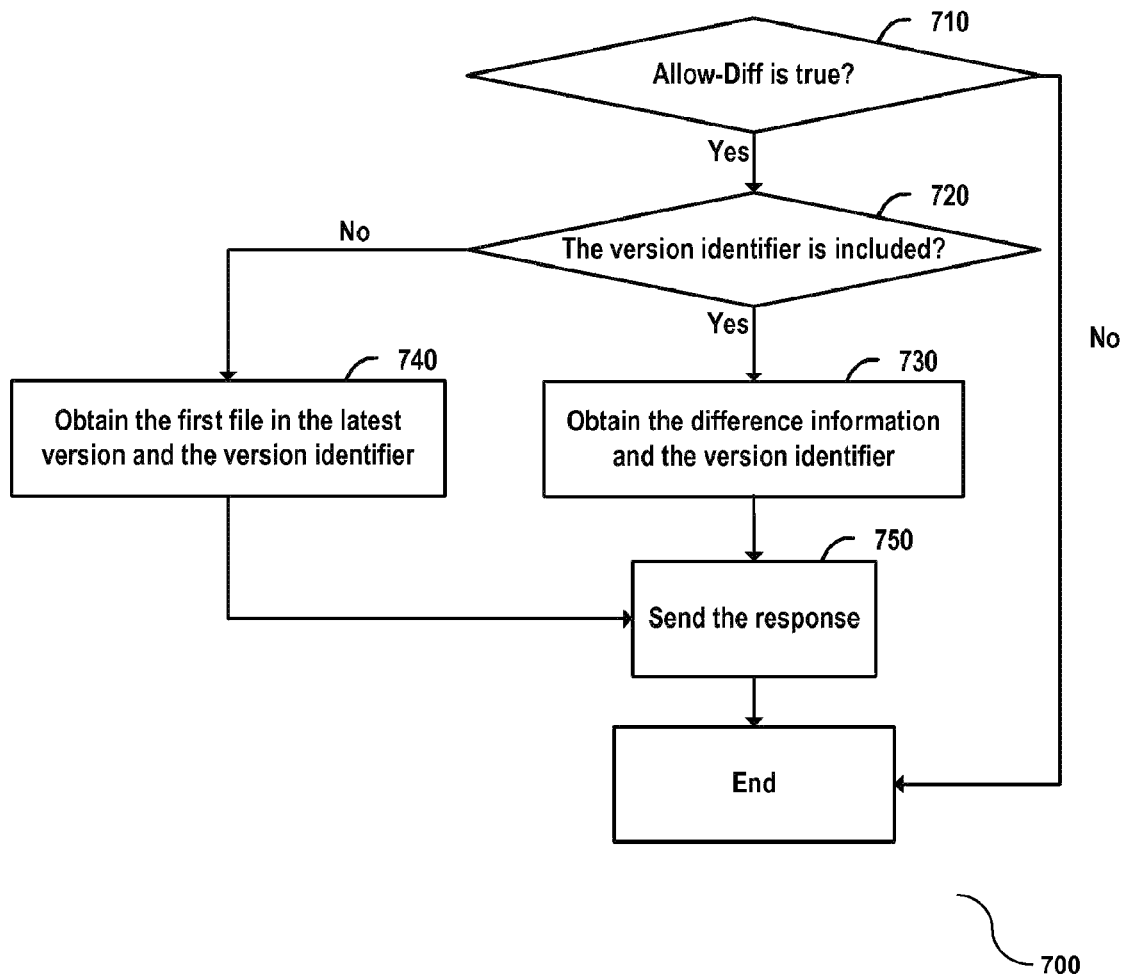
FIG. 7 shows a schematic flowchart of a still further example of combining multiple embodiments.

Referring to FIG. 7. a flow chart (700) is provided illustrating a method executed by the server. The method comprises: in step (710), judging whether or not the client has the capability of generating a first file in a new version according to difference information, by header Allow-Diff in an HTTP Request for example, if yes or being true, proceeding to step (720), if not or being false, ending. In step (720), judging whether or not the HTTP Request contains a version identifier, if yes proceeding to step (730), if not proceeding to step (740), for example the judgment is made according to header Diff-Version in the HTTP Request. In step (730), obtaining difference information and a version identifier of the latest version from the version control system. The version control system may be located on the server or other device connected with the server. The difference information is obtained based on the first file in the latest version and a first file in a version indicated by the version identifier in the HTTP Request. In step (740), obtaining the first file in the latest version and the version identifier. In step (750), sending an HTTP Response to the client. The HTTP Response containing the version identifier and one of difference information and the first file in the latest version. Those skilled in the art may understand when step (730) is being executed, the HTTP Response contains a version identifier and difference information. When step (740) is being executed, the HTTP Response contains a version identifier and the first file in the latest version.

Figure 8:
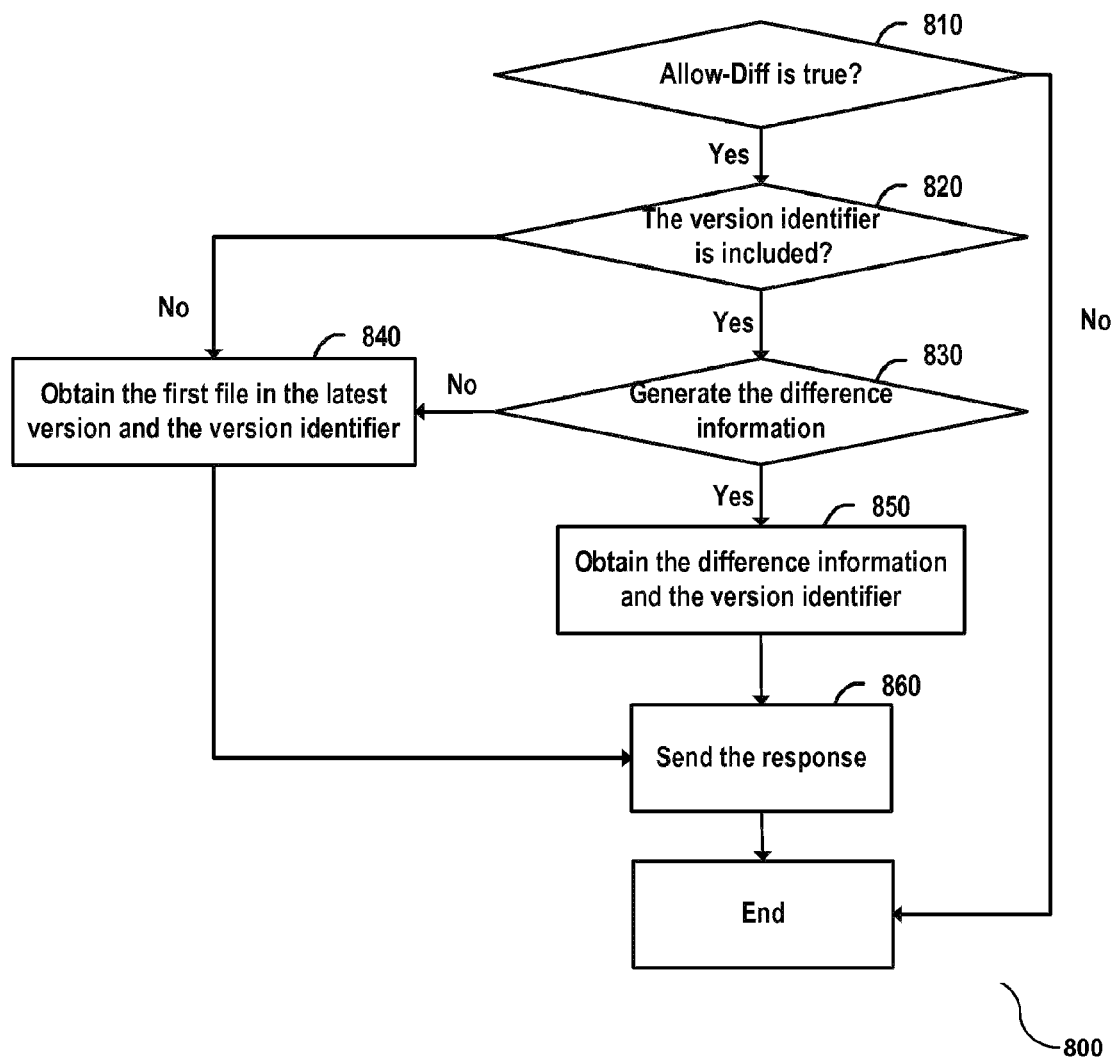
FIG. 8 shows a schematic flowchart of another still further example of combining multiple embodiments.

Referring to FIG. 8, a flow chart (800) is provided illustrating a method executed by the server. The method comprises: in step (810), judging whether or not the client has the capability of generating a first file in a new version according to difference information. For example the judgment may be made according to header Allow-Diff in an HTTP Request, if yes proceeding to step (820), if not ending. In step (820), judging whether or not the HTTP Request contains a version identifier, if yes proceeding to step (830), if not proceeding to step (840). For example the judgment may be made according to header Diff-Version in the HTTP Request. In step (830), judging according to a predefined rule whether or not difference information needs to be generated. If yes proceeding to step (850), if not proceeding to step (840). In step (850), obtaining difference information and a version identifier of the latest version from the version control system, wherein the version control system may be located on the server or other device connected with the server, and the difference information is obtained based on the first file in the latest version and a first file in a version indicated by the version identifier in the HTTP Request. In step (860), sending to the client an HTTP Response containing a version identifier and one of difference information and the first file in the latest version. In step (840), obtaining the first file in the latest version and the version identifier. In this embodiment, if generated difference information is greater than the first file in the latest version, then step (840) is executed. If generated difference information is greater than a certain defined value, then step (840) is executed. If overheads for generating difference information are far greater than traffic saved by transmitting difference information, then step (840) is executed. It can be seen that by flexibly setting predefined rules, a balance is struck between network traffic saved by transmitting difference information and overheads for generating difference information.

Figure 9:
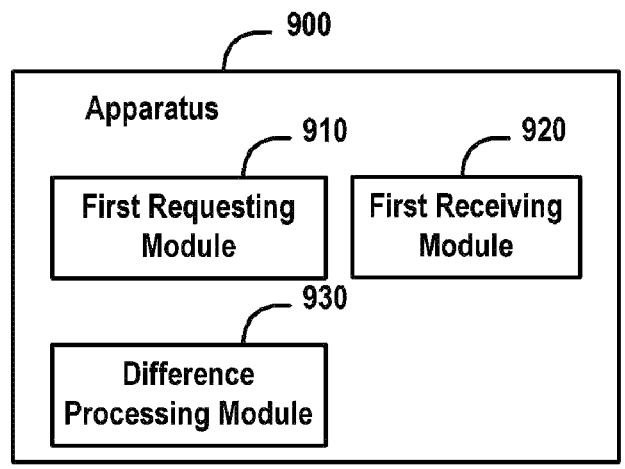
FIG. 9 shows a schematic structure of one apparatus for data transmission according to one embodiment.

The description has been presented above to various embodiments with reference to the figures. Those skilled in the art may understand the above methods can be implemented in software, hardware or a combination of software and hardware. Moreover, those skilled in the art may understand by implementing various steps in the above methods in software, hardware or a combination of software and hardware, there may be provided an apparatus for data transmission, as well as a client device and a server comprising a corresponding apparatus. Even though these apparatuses and systems have the same hardware structure as a general-purpose processing device, the functionality of software contained therein makes these apparatuses and systems manifest distinguishing properties from the general-purpose processing device, thereby forming apparatuses and systems of the following embodiments. With reference to FIG. 9, detailed description is presented below to an apparatus for data transmission provided by one embodiment.

With reference to FIG. 9, this figure provides an apparatus (900) for data transmission. Apparatus (900) comprises: a first requesting module (910) configured to send a first request to a server in response to a first file locally cached having expired. The first request being for obtaining the first file in a new version. The first request containing a first version identifier. The first version identifier being for indicating a version of the first file locally cached. A first receiving module (920) is configured to receive a first response sent by the server. The first response includes difference information and a second version identifier, wherein the difference information makes it possible to obtain the first file in the new version based on the first file locally cached, and the second version identifier is for indicating the new version. A difference processing module (930) is configured to obtain the first file in the new version based on the difference information and the first file locally cached. With the apparatus (900) provided in the present embodiment, when the file locally cached has expired, the difference information may be obtained from the server and then the file in a new version may be obtained from the difference information without a need of obtaining from the server a complete file in the new version, thereby reducing pressures on network transmission.

In one embodiment, the apparatus as shown in FIG. 9 may be browser or a browser plugin.

One embodiment a client device is provided, the device comprising an apparatus as shown in FIG. 9.

In one embodiment, apparatus (900) as shown in FIG. 9 may further comprise an association storing module configured to store the second version identifier in association with the obtained first file in the new version.

In one embodiment, apparatus (900) as shown in FIG. 9 may further comprise a cache judging module configured to, in response to a user intending to access a certain web page, judge whether there is locally cached a file needed for accessing the web page and whether the cached file has expired.

In one embodiment, in apparatus (900) as shown in FIG. 9, the first request further comprises an Allow identifier, the Allow identifier indicating it is locally capable of processing difference information. In response to the first request comprising the Allow identifier, the first response comprises the difference information and the second version identifier. In another embodiment, if the first request does not comprise an Allow identifier, then the first response only comprises the first file in a new version, but does not comprise the difference information or the second version identifier. By introducing the Allow identifier, the whole solution becomes more flexible and can conveniently differentiate between different clients supporting and not supporting an obtaining of the first file in a new version according to the difference information.

In one embodiment, the apparatus as shown in FIG. 9 may further comprise: a checking module configured to check whether there is locally cached a first file or not; send a second request in response to no first file being locally cached, the second request being for obtaining the first file; and receive a second response sent by the server. The second response comprising the first file and a third version identifier, the third version identifier being for indicating a version of the first file as included in the second response. By receiving the third version identifier, when the first file expires in the future, only the difference information instead of a complete first file in a new version the may be obtained, thereby reducing pressures on network transmission.

In one embodiment, apparatus (900) as shown in FIG. 9 further comprises: a difference judging module configured to judge whether a received response comprises difference information. In response to the received response comprising the difference information, execute the step of obtaining the first file in the new version according to the difference information and the first file locally cached. In response to the received response not comprising the difference information, cache a first file in the response.

Figure 10:
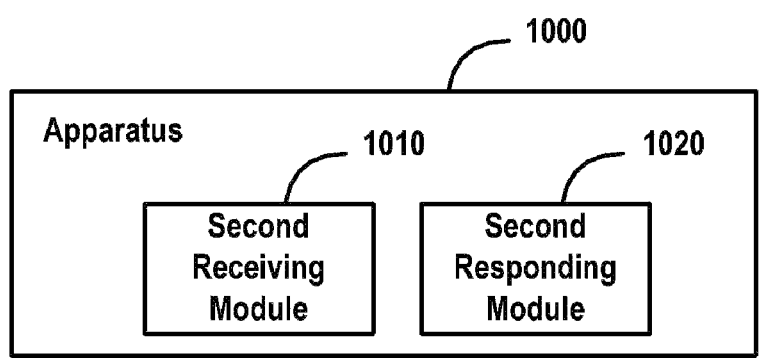
FIG. 10 shows a schematic structure of another apparatus for data transmission according to one embodiment.

Referring to FIG. 10, a block diagram is provided illustrating an apparatus (1000) for data transmission. Apparatus (1000) comprises: a second receiving module (1010) configured to receive a first request, the first request being for obtaining a first file; a second sending module (1020) configured to, in response to the first request comprising a first version identifier, send a first response to a sender of the first request, wherein the first version identifier is for indicating a version of the first file locally cached at the sender, the first response comprising difference information and a second version identifier, the difference information being for making it possible to obtain a first file in a new version based on the first file locally cached, the second version identifier being for indicating the new version. Using the apparatus provided by this embodiment, difference information may be provided to reduce contents in network transmission, thereby alleviating pressures on network transmission.

In one embodiment, apparatus (1000) as shown in FIG. 10 may be implemented as a server.

In one embodiment, in apparatus (1000) as shown in FIG. 10, the second sending module (1020) is specifically configured to, in response to the first request comprising a first version identifier, sending a first response to a sender of the first request according to a defined rule, wherein the defined rule is for striking a balance between overheads for generating the difference information and traffic saved by transferring the difference information. For detailed description of the defined rule, reference may be made to the method, which is not detailed here.

In one embodiment, apparatus (1000) as shown in FIG. 10 further comprises: a first version control module configured to generate the difference information according to the first version identifier.

In one embodiment, apparatus (1000) as shown in FIG. 10 further comprises: a second version control module configured to send the first version identifier to a version control system and receive the difference information and the second version identifier from the version control system.

In one embodiment, apparatus (1000) as shown in FIG. 10 further comprises: a third sending module configured to send a second response to the sender in response to the first request comprising an Allow identifier but not comprising the first version identifier. The second response comprising the first file and a third version identifier. The third version identifier being for indicating a version of the first file comprised in the second response. In another embodiment, the third sending module is configured to: send a second response to the sender in response to the first request not comprising the first version identifier, the second response comprising the first file and a third version identifier, the third version identifier being for indicating a version of the first file comprised in the second response.

Those skilled in the art may understand various apparatus embodiments of the disclosure may refer to and combine with each other for obtaining more embodiments. For implementation details of the apparatus embodiments, reference may be made to the above description of the method embodiments, which is not detailed here. Moreover, in concrete implementation of these embodiments, multiple modules may be implemented on the same hardware, or multiple parts of different modules may be implemented on the same hardware. For example, the functions of the second version control module may be performed by second sending module (1010) and second receiving module (1020), respectively; in hardware implementation, the second version control module may be implemented on the same hardware with second sending module (1010) and second receiving module (1020), respectively.

The present embodiments may be a system, a method, and/or a computer program product. The computer program product may include a computer readable storage medium (or media) having computer readable program instructions thereon for causing a processor to carry out aspects.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A client apparatus for data transmission, the client apparatus comprising:
   a processor; and
   a memory coupled to the processor, wherein the memory comprises instructions which, when executed by the processor, cause the processor to:
   in response to a first file locally cached in the memory having expired, send a first request to a server for obtaining a new version of the first file, wherein the first request includes a first version identifier indicating a current version of the first file locally cached in the memory;
   in response to version differences being detected by comparing the first version identifier to a second version identifier and in response to determining that difference information is smaller in size than a size of the new version of the first file, receive a first response from the server including difference information and the second version identifier, wherein the difference information indicates differences in the current version of the first file locally cached in the memory and the new version of the first file on the server, wherein the second version identifier is for indicating the new version of the first file, and, wherein the client apparatus receives the first response from the server including the difference information and the second version identifier in further response to the server determining that overheads for generating the difference information are less than a defined value;
   send a second request to the server to obtain only changed content in current version of the first file locally cached in the memory based on the difference information;
   receive the changed content from the server; and
   use the changed content received from the server and unchanged content from the first file locally cached in the memory to display the new version of the first file to a user.

2. The client apparatus according to claim 1, wherein the instructions further cause the processor to:
   store the second version identifier in association with the new version of the first file that comprises the unchanged content from the first file locally cached in the memory patched with the changed content received from the server.

3. The client apparatus according to claim 1, wherein the first request further comprises an Allow identifier, the Allow identifier indicating the client apparatus is capable of processing difference information and wherein, in response to the first request comprising the Allow identifier, the first response includes the difference information and the second version identifier.

4. The client apparatus according to claim 1, wherein the instructions further cause the processor to:
   in response to no version differences being detected by comparing the first version identifier to a second version identifier, receive a second response from the server indicating no differences in the current version of the first file locally cached in the memory and the new version of the first file on the server; and
   display the first file locally cached in the memory to the user.

5. The client apparatus according to claim 1, wherein the client apparatus receives the first response from the server including the difference information and the second version identifier in further response to the server determining that the first version identifier is older than a defined version.

6. A server apparatus for data transmission, the server apparatus comprising:
a processor; and
a memory coupled to the processor, wherein the memory comprises instructions which, when executed by the processor, cause the processor to:
in response to a first file locally cached in a memory of a client device having expired, receive from the client device a first request for obtaining a new version of the first file from the server apparatus, wherein the first request includes a first version identifier indicating a current version of the first file locally cached in the memory of the client device;
in response to version differences being detected by comparing the first version identifier to a second version identifier and in response to determining that difference information is smaller in size than a size of the new version of the first file, send a first response to the client device including difference information and the second version identifier, wherein the difference information indicates differences in the current version of the first file locally cached in the memory of the client device and the new version of the first file in the server apparatus, wherein the second version identifier is for indicating the new version of the first file, and wherein the server apparatus sends the first response to the client device including the difference information and the second version identifier in further response to determining that overheads for generating the difference information are less than a defined value;
receive a second request from the client device to obtain only changed content in current version of the first file locally cached in the memory based on the difference information; and
send the changed content to the client device in order that the client device uses the changed content received from the server apparatus and unchanged content from the first file locally cached in the memory of the client device to display the new version of the first file to a user.

7. The server apparatus according to claim 6, wherein the first request further comprises an Allow identifier, the Allow identifier indicating the client device is capable of processing difference information and wherein, in response to the first request comprising the Allow identifier, the first response includes the difference information and the second version identifier.

8. The server apparatus according to claim 6, wherein the instructions further cause the processor to:
in response to no version differences being detected by comparing the first version identifier to a second version identifier, send a second response to the client device indicating no differences in the current version of the first file locally cached in the memory of the client device and the new version of the first file on the server apparatus in order that the client device displays the first file locally cached in the memory of the client device to the user.

9. The server apparatus according to claim 6, wherein the server apparatus sends the first response to the client device including the difference information and the second version identifier in further response to determining that the first version identifier is older than a defined version.

* * * * *